United States Patent Office 3,518,175
Patented June 30, 1970

3,518,175
PROCESS OF FORMING CROSSLINKABLE COPOLYMERS OF POLYESTERS AND SUBSTITUTED BENZOPHENONES AND PRODUCT THEREOF
Vernon Lee Bell, Newport News, Va., assignor to E. I. du Pont de Nemours and Company, Wilmington, Del., a corporation of Delaware
No Drawing. Continuation-in-part of application Ser. No. 455,313, May 12, 1965. This application Apr. 15, 1966, Ser. No. 542,750
Int. Cl. C08f 47/00
U.S. Cl. 204—159.19       16 Claims

ABSTRACT OF THE DISCLOSURE

Crosslinkable copolymers formed by copolymerizing an organic polyester, e.g., polyethylene terephthalate, with a photosensitizing compound selected from a limited group of substituted benzophenones.

---

This application is a continuation-in-part of my copending application Ser. No. 455,313, filed May 12, 1965, now abandoned.

Highly polymeric synthetic polyesters made from aromatic dicarboxylic acids and glycols having from two to ten carbon atoms possess many properties which, particularly in the form of self-supporting films, make them useful as articles of commerce. Even the most important of these polyesters, e.g., polyethylene terephthalate, suffer, however, from various deficiencies which it is desired to remedy. Some of these deficiencies reside, for example, in stability, thickness strength, and zero strength temperature. Attempts to achieve improvements while retaining the already desirable properties as by copolymerizing polyethylene terephthalate with varying amounts of a second acid component have usually failed to achieve the desired purpose. The end result of such attempts has been a randomized copolyester film having a lower melting point, a low crystallinity and deficiencies in certain other physical properties.

In accordance with the present invention, it has been found that a polyester having dimensional stability, thickness direction strength, and zero strength, particularly in the form of a film, can be obtained by copolymerizing the polyester with one or more of certain monomers which photosensitize the resulting polymer, shaping the polymer into the manufacture ultimately desired, and finally crosslinking the polymer through the photosensitizing units incorporated in the polyester chain.

In one aspect, the present invention is the copolymer of any one of the well-known linear polyesters (the "basic" polymer of this invention) with a photosensitizing compound. It is thus a terpolymer consisting of three mers or moieties, the acid and alcohol mers making up the basic polymer and the photosensitizing mer derived from the photosensitizing compound. The terpolymer itself exists in two forms, the intermediate or noncrosslinked form formed directly by polymerization, and the crosslinked form produced upon irradiation. Additional mers may, of course, be incorporated in the basic polymer if more than one acid or alcohol are employed.

The gross composition of the ultimate or crosslinked polymer is the same as that of the noncrosslinked polymer, the only structural difference between the two being the crosslinking through the photosensitizing units. The ultimate or crosslinked polymer is characterized by insolubility in a solvent in which the intermediate polymer was soluble and, in general, greater intractability than the precursor polymer.

The basic polymer of the invention is the polyester of (1) carbonic acid or at least one dicarboxylic acid and (2) at least one glycol of the formula (HO)R(OH) where R is a divalent radical as defined below.

Preferred dicarboxylic acids are the isomeric dicarboxylic acids derived from benzene, terephthalic acid being particularly desirable. It will be understood that, in the actual manufacture of polyterephthalates, alkyl esters of the acid having up to 7 carbons in the alkyl groups can be substituted for the acid as shown by Whinfield and Dickson U.S. Pat. No. 2,465,319. Aliphatic dicarboxylic acids such as sebacic and azelaic acids can also be used in forming the basic polymer.

Glycols of formula (HO)R(OH) which are suitable include those where R is: $\text{-(CH}_2\text{)}_n\text{-}$, $n$ being 2–10;

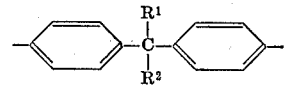

$R^1$ being methyl or hydrogen and $R^2$ being hydrogen or lower alkyl;

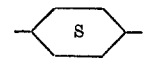

(sym.-cyclohexylene); and

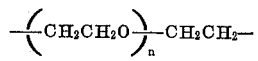

The preferred glycol is ethylene glycol. Usable glycols include, however, 1,4-cyclohexanedimethanol, propylene glycol, diethylene glycol, and the like.

The preferred basic polyester of the invention is polyethylene terephthalate which may be prepared from a low molecular weight alkyl ester of terephthalic acid, e.g., dimethyl terephthalate, and ethylene glycol as shown in the above-mentioned Whinfield and Dickson patent. Other suitable polyesters from dibasic acids are (1) those prepared from terephthalic acids or low molecular-weight alkyl esters thereof and 1,4-cyclohexanedimethanol and (2) copolyesters prepared from terephthalic acid, ethylene glycol, and a second dicarboxylic acid, the second acid component being present in quantities up to 20% by weight, e.g., 80/20% poly(ethylene terephthalate/ethylene sebacate). Other specific usable dicarboxylic acid polymeric esters include poly(ethylene 2,6-naphthalate), poly(ethylene 1,5-naphthalate), poly(ethylene isophthalate), poly(ethylene hexahydroterephthalate) and the copolyester formed from ethylene glycol, dimethyl bibenzoate and 2,2-bis(4-carbomethoxyphenyl)propane.

Preferred polycarbonates for use in the invention are those of the formula

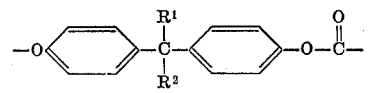

where $R^1$ and $R^2$ are as defined above. These polyesters can be prepared from the interaction of an alkylidene-4,4'-diphenol and phosgene as described by Schnell, Angewandte Chemie 68, 633–660, No. 20 (1956). Specific usable carbonate polyesters include (2,2,-bis[4-hydroxyphenyl]propane carbonate),
poly(1,1-bis[4-hydroxyphenyl]ethane carbonate) and
poly(1,1-bis[4-hydroxyphenyl]isobutane carbonate).

The photosensitizing moiety of the polymer is derived from 0.01 to 10 mol percent of a photosensitizing compound, generally a benzophenone of the formula

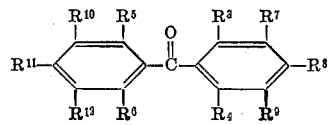

wherein: $R^3$, $R^4$, $R^5$ and $R^6$ are hydrogen, methoxy, chlorine or fluorine; and the other R's are hydrogen, $$-(CH_2)_p-OH, \quad -O-(CH_2)_2-OH \text{ or}$$

$$-(CH_2)_pCOOR_{15}$$

where $p$ is 0–10 and $R_{15}$ is hydrogen or lower alkyl, at least one each of $R^7$–$R^8$–$R^9$ and $R^{10}$–$R^{11}$–$R^{12}$ being other than hydrogen. The preferred photosensitizer is 4,4'-dicarbomethoxybenzophenone. Other benzophenone derivatives which may be employed include:

4,4'-dicarboxymethylbenzophenone;
4,4'-dicarboxyethylbenzophenone;
3,3'-dicarboxyethylbenzophenone;
3,3-dicarboxymethylbenzophenone;
4,4'-di-β-hydroxyethylbenzophenone;
3,3'-di-β-hydroxyethylbenzophenone;
4-carboxymethyl-4'-β-hydroxyethylbenzophenone;
4,4'-bis(2-hydroxyethoxy)benzophenone.

In addition to the benzophenone derivatives described above, also applicable to supply the photosensitizing mer to the ultimate polymer may be mentioned aromatic ketones such as (a)
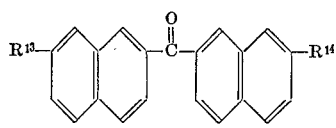

and (b)
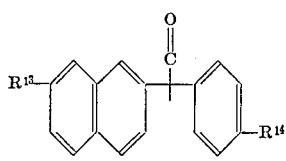

wherein $R^{13}$ and $R^{14}$ are $-(CH_2)_p-OH$, $$-O-(CH_2)_2-OH \text{ or } -(CH_2)_pCOOR_{15}$$

$p$ and $R_{15}$ being as above. A specific example of (a) is 5,5'-dicarboxydinaphthyl ketone while a specific example of (b) is 5-carboxynaphthyl-4-carboxyphenyl ketone.

The intermediate polymer of the invention may be formed by an adaptation of either of the two methods of preparing the basic polymer given by the Whinfield and Dickson patent. In method (I), the three monomers, i.e., of the glycol, of the acid (or low-molecular weight alkyl ester thereof) and of the photosensitizer are reacted together in an ester interchange reaction similar to those shown by the patent except that the appropriate amount of the photosensitizer is included to the mixture. In method (II), a preformed monomer of the components of the basic polymer, e.g., bis(2-hydroxyethyl) terephthalate, is polymerized in the usual fashion except that the photosensitizer is added before substantial polymerization takes place, i.e., the intrinsic viscosity of the reaction mixture has not exceeded 0.2.

The process conditions, e.g., temperature, pressure, catalyst, etc., for methods (I) and (II) are substantially the same as those shown for the basic reaction by Whinfield et al. and the ratios of the glycol-acid monomers are the same, i.e., 1:1 in the polyester. The quantity of photosensitizing material added to the reactant mixture in either synthetic process should be such that the final copolymer is composed of 0.1–10 mole percent, preferably 1–5 mole percent of the same, the remainder being polyester units. Less than 0.1 mole percent of the photosensitizer does not permit sufficient crosslinking in the subsequent irradiating step while more than about 10 percent does not provide sufficient improvement to warrant the expense. It has been found that the reaction is very efficient so that a reaction mixture of about 0.1–10 mole percent of the substituted benzophenone and about 99.9–90 mole percent of the polyester usually will provide the desired copolymer product.

The noncrosslinked, or intermediate, product, in a preferred form, is a substantially linear copolymer having an intrinsic viscosity of at least 0.5 and recurring units of the formulae:

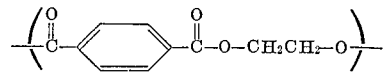

and

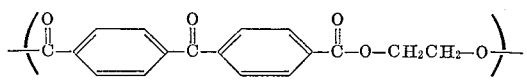

The determination of the structure is accomplished by infrared spectral techniques known to those skilled in the art (see, for example, W. M. E. Bryant et al., J. Am. Chem. Soc. 75, 6113 (1953), and F. W. Billmeyer, "Text Book of Polymer Chemistry," Chapter 7, Interscience Publishers (1957)).

While the structure of the ultimate, or crosslinked, polymer is not definitely known, the crosslinking must take place through the photosensitizing group. A likely formula for a crosslinking unit can thus be written as:

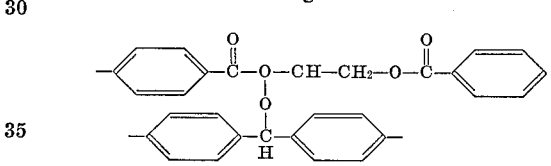

Since the noncrosslinked polymer is more tractable than the crosslinked, the intermediate is generally formed into a desired manufacture before crosslinking. Thus, after copolymerization, the polymeric composition may be made into a thin film by any conventional method such as melt-extrusion, melt-pressing, etc. After quenching to a temperature of 40° C. or below, it may be molecularly oriented by stretching and/or rolling by conventional means in both the longitudinal and transverse directions to an extent of at least 2.5× (preferably 3.0) its initial dimensions, subsequently heat-set at a temperature of at least 150° C. and then subjected to irradiation. Usually ultraviolet light of a wavelength of 2,000–4,000 A. is used to produce crosslinking but other electromagnetic radiation may be used as well. The crosslinking period is at least 0.1 second but usually from five seconds to about 30 minutes under conventional radiation means, e.g., sunlamps, sunlight and the like.

It will be obvious that (1) heat-setting and irradiation of an oriented film or filament may conveniently be carried out simultaneously, and (2) a film or filament may be irradiated, after casting and quenching, to the extent necessary to increase its toughness and adaptability to subsequent stretching operations or end-use applications.

The invention will be more clearly understood by referring to the examples which follow. In these examples, values for dimensional stability, thickness direction strength and zero strength temperature are presented. These terms may be defined as follows:

Dimensional stability, often referred to as "thermal dimensional stability," is a measure of the ability of the film to resist shrinkage at elevated temperatures. A measurement of thermal dimensional stability may be obtained by hanging an otherwise unrestrained sample of the film of known dimensions (10" x 10") in an oven at a known elevated temperature for a given time, measuring the new dimensions and expressing the difference in dimensions over the original dimensions as a percentage of shrinkage;

Thickness direction strength is measured by the rice-pouch durability test. In this test the films to be tested are coated with a hard, heat-sealable, coating such as a 90/10/1 (parts by weight) vinylidene chloride/acrylonitrile/itaconic acid terpolymer composition, formed into 3 x 6″ pouches containing 100 gms. of rice, and dropped from a two-foot height onto a hard surface. The number of drops until film failure is measured; and Zero strength temperature is that temperature at which material, e.g., film, supports a load of 20 pounds per cross-sectional square inch for 5±0.5 seconds. The test is carried out by placing the sample to be tested in contact with a heated bar, the proper load being previously applied and determining the length of time required for failure. This is carried out at various temperatures until the zero strength temperature is determined. The zero strength temperature is a measure of the ability of the film to withstand short term exposure to high temperatures. This is extremely important in electrical applications such as insulation for electrical motors.

EXAMPLES 1–13

(A) Three mixtures were made up each containing 762 g. (3.0 mole) of bis(2-hydroxyethyl) terephthalate (prepared by means of an ester interchange reaction between dimethyl terephthalate and ethylene glycol as described in U.S. Pat. No. 2,465,319) and, respectively, 17.9 g. (0.06 mole), 447.5 g. (0.015 mole) and 895 g. (0.3 mole) of 4,4′-dicarbomethoxybenzophenone. Each mixture was melted and poured into a one-liter, single-neck, round-bottom flask preheated in a dimethylphthalate bath at 283° C. and equipped with hollow stainless-steel stirrer powered by a constant torque motor. The melt was stirred and nitrogen was passed through the stirrer into the molten mixture. Tetraisopropyl titanate (15 p.p.m.) was added as a catalyst. Ethylene glycol was collected at atmospheric pressure for one hour and then the pressure was gradually diminished over 30 minutes to less than 0.5 mm. The polymerization was continued for 2–3 hours until the molten polymer was a thick, nearly immobile mass which was honeycombed with nitrogen bubbles. The polymers obtained had intrinsic viscosities of 0.53 or greater. The polymers contained 2, 5 and 10 moles percent of the 4,4′-dicarboxybenzophenone, respectively, as determined by analysis.

The analytical procedure for determining the percentage of dicarboxybenzophenone in the copolymer consisted in dissolving the copolymer in dichlorotetrafluoroacetone hydrate-water and measuring the solution absorbancy at 274 and 290μ. The concentration of terephthalyl and 4,4′-dicarboxybenzophenone was calculated from the following equations:

$$c_D = \frac{(A_1)(1.77 \times 10^3) - (A_2)(1.25 \times 10^3)}{3.61 \times 10^7}$$

$$c_T = \frac{(A_2)(2.71 \times 10^4) - (A_1)(9.47 \times 10^3)}{3.61 \times 10^7}$$

and

Mole percent of $DCBP = \frac{c_D}{c_T + c_D} \times 100$ where $c_D$ is the concentration of dicarboxybenzophenone; $c_T$ is the concentration of terephthalyl; $A_1$ is the absorbency determined at 274 mil; and $A_2$ is the absorbency determined at 290 ml.

(B) The polymer prepared above was melt-pressed at 275° C. into clear, nearly colorless, flexible films 10 mil in thickness. After cooling to room temperature, the film was stretched to an extent of 3.0 times (×) the initial dimensions in both directions in the manner described in Scarlett U.S. Pat. No. 2,823,421 and heat-set at a temperature of 200° C.

Several samples of the 2, 5, and 10% ethylene benzophenonedicarboxylate/terephthalate copolymers were then subjected to the action of a 400 watt high pressure mercury arc lamp at 125° C. for intervals of time ranging from just until the copolymer was no longer soluble in a tetrachloroethylene mixture (approximately 150 seconds) to 1500 seconds.

The physical properties of the irradiated or cross-linked films were measured and compared with those of (1) commercially available oriented polyethylene terephthalate film 1 mil thick and (2) the noncrosslinked copolymers. Table I below lists the tensile properties (modulus, tenacity, $F_5$) and the high temperature properties (dimensional stability at 150 and 200° C. and zero strength temperature).

TABLE I.—COMPARATIVE PHYSICAL PROPERTY DATA FOR CROSSLINKED ETHYLENE TEREPHTHALATE/4,4′-BENZOPHENONEDICARBOXYLATE COPOLYMERS (95/2, 95/5, 90/10 MOLE PERCENT), NONCROSSLINKED ETHYLENE TEREPHTHALATE/4,4′-BENZOPHENONEDICARBOXYLATE COPOLYMERS, AND ORIENTED POLYETHYLENE TEREPHTHALATE

| Example No. | Type film | Exposure time to irradiation (sec.) | Tensile properties [1] | | | High temperature properties | | Zero strength temp., °C. |
| | | | Modulus, p.s.i. (10⁻³) | Tenacity, p.s.i. (10⁻³) | $F_5$ p.s.i. (10⁻³) | Dimensional stability | | |
| | | | | | | 150° C. | 200° C. | |
|---|---|---|---|---|---|---|---|---|
| 1 | Oriented polyethylene terephthalate (control). | | 573 | 25.7 | 15.3 | 1.48 | 3.47 | 230 |
| 2 | Noncrosslinked ET/BDC [2] 98/2 (control). | | 594 | 24.9 | 15.9 | 1.35 | 4.16 | 225 |
| 3 | Noncrosslinked ET/BDC 95/5 (control). | | 680 | 32.0 | 16.0 | 1.00 | 10.00 | 230 |
| 4 | Noncrosslinked ET/BDC 90/10 (control). | | 600 | 20.0 | 15.0 | 1.00 | 4.00 | 225 |
| 5 | Crosslinked ET/BDC 98/2 | 300 | 600 | 28.0 | 16.0 | 0.40 | 4.00 | 255 |
| 6 | do | 500 | 600 | 24.0 | 16.0 | 0.28 | 3.30 | 275 |
| 7 | do | 1,000 | 600 | 20.0 | 16.0 | 0.27 | 2.80 | 320 |
| 8 | Crosslinked ET/BDC 95/5 | 300 | 680 | 32.0 | 16.0 | 0.80 | 3.40 | 380 |
| 9 | do | 500 | 680 | 32.0 | 16.0 | 0.72 | 3.00 | 395 |
| 10 | do | 1,000 | 640 | 32.0 | 16.0 | 0.60 | 2.60 | 395 |
| 11 | Crosslinked ET/BDC 90/10 | 300 | 600 | 20.0 | 16.0 | 1.20 | 2.40 | 300 |
| 12 | do | 500 | 600 | 20.0 | 16.0 | 0.80 | 1.60 | 350 |
| 13 | do | 1,000 | 600 | 20.0 | 16.0 | 0.60 | 1.60 | 375 |

[1] Average of two directional values.  [2] ET/BDC is ethylene terephthalate/4,4′-benzophenonedicarboxylate copolymer.

EXAMPLES 14–16

Ethyleneterephthalate/4,4′-benzophenonedicarboxylate copolymer (96/4 mole percent) was prepared as described in Examples 1–13. The films formed from this copolymer were molecularly oriented by stretching them 3.2× their initial dimension in the transverse direction and 4.3× their initial dimension in the longitudinal direction in a manner similar to that described in Winter, U.S. Pat. No. 2,995,779 and heat-set at a temperature of 200° C.

Several samples were then subjected to the action of a 400 watt high pressure mercury arc lamp at 125° C. for 1500 seconds. The physical properties of the crosslinked films were measured and compared with those of (1) commercially available oriented polyethylene terephthalate film 1 mil thick and (2) the noncrosslinked copolymer. Table II below lists the tensile properties (modulus, tenacity, $F_5$) and the high temperature properties (dimensional stability at 105° and 150° C. and zero strength temperature).

dimethyl terephthalate, 0.2 mole (28.8 g.) of 1,4-cyclohexanedimethanol, and 16 drops of a 14.4% solution of the monosodium salt of O-butyl titanate in n-butanol were placed in a flask and heated with stirring to 190–200° C. The ester interchange was rapid and as soon as the methanol had all distilled out of the reaction mixture (about 20 minutes) the temperature was increased to about 270° C. The reaction was then put under reduced pressure (about 1 mm.) and the temperature raised to 300–310° C. over a 1½ hour period. The reaction became more viscous but remained colorless. The reaction mixture was then let down to atmospheric pressure with nitrogen and the resulting polymer removed. The resulting white opaque solid had a crystalline melting point of 290–300° C. and an inherent viscosity of 0.78.

TABLE II.—COMPARATIVE PHYSICAL PROPERTY DATA FOR CROSSLINKED ET/BDC COPOLYMER (96/4 MOLE PERCENT), NONCROSSLINKED ET/BDC COPOLYMER (96/4 MOLE PERCENT), AND ORIENTED POLYETHYLENE TEREPHTHALATE

| Example No. | Type film | Exposure time to irradiation (sec.) | Tensile properties | | | High temperature properties | | |
|---|---|---|---|---|---|---|---|---|
| | | | Modulus, (p.s.i.×10⁻³) LD | Tenacity (p.s.i.×10⁻³) LD | $F_5$ (p.s.i.×10⁻³) LD | Dimensional stability | | Zero strength temp., ° C. |
| | | | | | | 105° C. LD | 150° C. LD | |
| 14 | Oriented polyethyl. terephthalate (stretched 3.2XTD by 4.3XLD). | | 924 | 46.8 | 21.2 | 2.36 | 10.50 | 230 |
| 15 | Noncrosslinked ET/BDC 96/4 (control) (stretched 3.2XTD by 4.3XLD). | | 806 | 29.4 | 19.8 | 1.75 | 4.21 | 213 |
| 16 | Crosslinked ET/BDC 96/6 (stretched 3.2XTD by 4.3XLD). | 1,500 | 950 | 39.3 | 20.0 | 0.37 | 2.79 | 383 |

EXAMPLES 17–19

Ethylene terephthalate/4,4' - benzophenone dicarboxylate copolymer (96/4 mole percent) was prepared in a manner identical with that described in Examples 1–13. The films formed from this copolymer were molecularly oriented by stretching the films 4× their initial dimensions in both the longitudinal and transverse directions in a manner described in Examples 14–16. The films were heat-set at a temperature of 200° C.

Several samples were then subjected to the action of a 400-watt high pressure mercury arc lamp at 125° C. for 1500 seconds. The thickness direction strength as measured by the rice pouch durability test was determined for these crosslinked films and compared with those of (1) commercially available oriented (2) the noncrosslinked copolymer. Table III lists the results of these tests.

TABLE III.—COMPARATIVE THICKNESS DIRECTION STRENGTHS FOR CROSSLINKED ET/BDC COPOLYMER (96/4 MOLE PERCENT), NONCROSSLINKED ET/BDC COPOLYMER (96/4 MOLE PERCENT) AND ORIENTED POLYETHYLENE TEREPHTHALATE

| Example No. | Type of film | Thickness direction strength (rice pouch durability, avg. No. of drops without breaking) |
|---|---|---|
| 17 | Oriented polyethylene terephthalate (stretched 3.0XTD by 3.0XLD). | 0.6 |
| 18 | Noncrosslinked ET/BDC 96/4 (control) (stretched 4.0XTD by 4.0XLD). | 1.1 |
| 19 | Crosslinked ET/BDC 96/4 (stretched 4.0XTD by 4.0XLD). | 10.4 |

EXAMPLE 20

Ethylene terephthalate/4,4' - bis(2 - hydroxyethoxy)-benzophenone copolymer (96/4 mole percent) was prepared in a manner similar to that described in the previous examples. Films formed from the copolymer composition by melt-pressing were molecularly oriented by stretching 3 times (×) their initial dimensions in both the longitudinal and transverse directions, heat-set at 200° C. and then subjected to the action of a 400-watt mercury arc lamp at 125° C. for 1500 seconds. The crosslinked copolymer exhibited increased zero strength temperature, thickness direction strength, and dimensional stability.

EXAMPLE 21

An ester interchange reaction was carried out between 1,4-cyclohexanadimethanol and dimethyl terephthalate as described in the Kebler and Smith U.S. Pat. No. 2,901,-466. In carrying out this process, 0.1 mole (19.4 g.) of A part of the monomeric or partially polymerized 1, 4-cyclohexanedimethanol/dimethyl terephthalate product was then copolymerized with 4 mole perecnt of 4,4'-dicarbomethoxybenzophenone. Films formed from the copolymeric composition by melt-pressing were molecularly oriented by stretching 3.0× their initial dimensions in both the longitudinal and transverse directions, heat-set at 200° C. and then subjected to the acton of a 400-watt mercury arc lamp at 125° C. until the material was no longer soluble in a tetrachlorethane/phenol solvent mixture. The crosslinked copolymeric compositions exhibited enhanced high temperature properties when compared with the homopolymer and noncrosslinked copolymer.

The crosslinked copolymers characterizing the present invention provide for tough, durable films which are capable of being employed where high temperature property requisites preclude the use of the noncrosslinked polymers. These films possess materially enhanced thickness direction strength, thermal dimensional stability, and higher zero strength temperatures. They may thus be ideally empolyed in many end-use applications, particularly where subject to high temperatures and humidity, such as in insulation for electrical motors and as bases for magnetic tapes.

Since obvious modifications and equivalents in the invention will be evident to those skilled in the chemical arts, we propose to be bound solely by the appended claims.

What is claimed is:

1. A copolymer of a synthetic polyester of (1) at least one acid from the group consisting of carbonic acid and dicarboxylic acids, and (2) at least one glycol of the formula (HO)R(OH) where R is a divalent radical selected from the group consisting of $\text{-(CH}_2\text{)}_n\text{-}$ $n$ being 2–10,

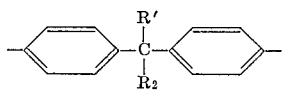

R' is methyl or hydrogen and $R_2$ is lower alkyl or hydrogen, symmetrical hexylene, and

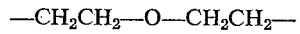

—CH₂CH₂—O—CH₂CH₂— and 0.1–10 mole percent of a photosensitizing compound of the group consisting of:

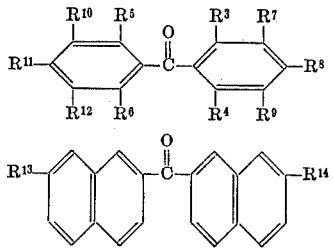

and

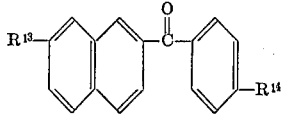

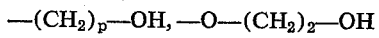

wherein:
R³, R⁴, R⁵ and R⁶ are hydrogen, methoxy, chlorine or fluorine;
R⁷, R⁸, R⁹, R¹⁰, R¹¹, and R¹² are hydrogen, $-(CH_2)_p-OH, -O-(CH_2)_2-OH$ and $-(CH_2)_pCOOR_{15}$, $p$ is 0–10 and $R_{15}$ is hydrogen or lower alkyl, at least one each of R⁷–R⁸–R⁹ and R¹⁰–R¹¹–R¹² being other than hydrogen; and R¹³ and R⁴ are $-(CH_2)_p-OH, -O-(CH_2)_2-OH$ or $-(CH_2)_pCOOR_{15}$.

2. A copolymer of claim 1 in crosslinked form.
3. A copolymer of claim 1 wherein the polyester is a terephthalate.
4. A copolymer of claim 3 wherein the polyester is polyethylene terephthalate.
5. A copolymer of ethylene terephthalated and 0.1–10 mole percent of 4,4'-benzophenonedicarboxylate.
6. A copolymer of ethylene terephthalate and 0.1–10 mole percent of 4,4'-bis(2'-hydroxyethoxy)benzophenone.
7. A copolymer of ethylene terephthalate and 0.10–10 mole percent of 4,4'-benzophenonedicarboxylate crosslinked through units of the latter.
8. A copolymer of ethylene terephthalate and 0.10–10 mole percent of 4,4'-bis(2-hydroxyethoxy)benzophenone crosslinked through units of the latter.
9. In the process of forming a synthetic polyester of (1) at least one acid from the group consisting of carbonic acid and dicarboxylic acids, and (2) at least one glycol of the formula (HO)R(OH) where R is a divalent radical selected from the group consisting of $-(CH_2)_n-$ being 2–10,

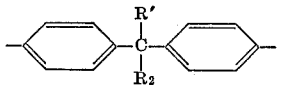

R' is methyl or hydrogen and R₂ is lower alkyl or hydrogen, symmetrical hexylene, and

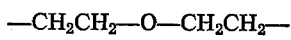

the step of incorporating in the reaction mixture 0.1–10 mole percent of a photosensitizing compound of the group consisting of

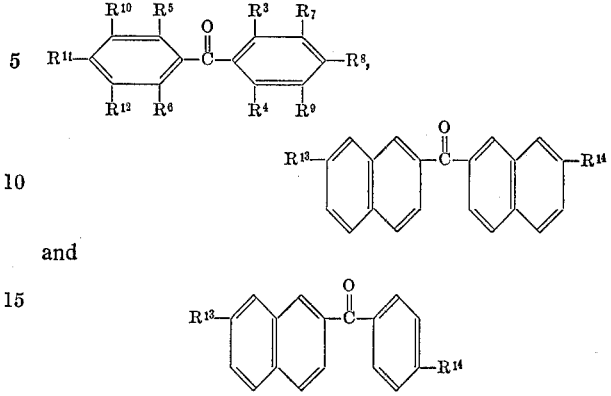

and

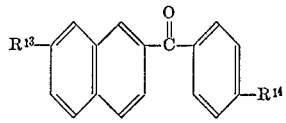

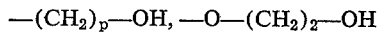

wherein:
R³, R⁴, R⁵ and R⁶ are hydrogen, methoxy, chlorine or fluorine;
R⁷, R⁸, R⁹, R¹⁰, R¹¹ and R¹² are hydrogen, $-(CH_2)_p-OH, -O-(CH_2)_2-OH$ and $-(CH_2)_pCOOR_{15}$, $p$ is 0.10 and $R_{15}$ is hydrogen or lower alkyl, at least one each of R⁷–R⁸–R⁹ and R¹⁰–R¹¹–R¹² being other than hydrogen; and R¹³ and R¹⁴ are $-(CH_2)_p-OH, -O-CH_2)_2-OH$ and $-(CH_2)_pCOOR_{15}$.

10. In the process of forming ethylene terephthalate polymer by the polymerization of bis(2-hydroxyethyl) terephthalate, the step of incorporating 0.1–10 mole percent of 4,4'-dicarbomethoxybenzophenone in the reaction mixture and thereby incorporating a recurring photosensitizing mer of 4,4'-benzophenonedicarboxylate in the resultant ethylene terephthalate polymer.

11. The process which comprises subjecting a polymer of claim 2 to the action of irradiation and thereby crosslinking the same through the photosensitizing units.

12. The process which comprises synthesizing a polymer of claim 2, forming the same into a shaped object, and subjecting the shaped object to ultraviolet light.

13. The process which comprises forming a copolymer of ethylene terephthalate and 0.1–10 mole percent of 4,4'-benzophenonedicarboxylate, forming the same into a film, and subjecting the film to the action of ultraviolet light.

14. A film formed from a copolymer of claim 3.
15. A film formed from a crosslinked copolymer of ethylene terephthalate and 0.1–10 mole percent of 4,4'-benzophenonedicarboxylate.
16. A film formed from a crosslinked copolymer of ethylene terephthalate and 0.1–10 mole percent of 4,4'-bis(2-hydroxyethoxy)benzophenone.

References Cited

UNITED STATES PATENTS

| | | | |
|---|---|---|---|
| 3,265,772 | 8/1966 | Tocker | 260—885 |
| 3,317,462 | 5/1967 | Goldberg et al. | 260—47 |
| 3,366,668 | 1/1968 | Strobel et al. | 260—475 |
| 3,385,910 | 5/1968 | Tocker | 260—47 |

SAMUEL H. BELCH, Primary Examiner

R. B. TURER, Assistant Examiner

U.S. Cl. X.R.

260—47, 63, 75, 77.5; 204—159, 14

PO-1050
(5/69)

UNITED STATES PATENT OFFICE
CERTIFICATE OF CORRECTION

Patent No. 3,518,175          Dated June 30, 1970

Inventor(s) Vernon Lee Bell

It is certified that error appears in the above-identified patent and that said Letters Patent are hereby corrected as shown below:

Column 2, line 60, "(2,2,-bis[4-hydroxyphenyl]propane carbonate)" should read -- poly(2,2-bis[4-hydroxyphenyl]propane carbonate) --.

Column 4, lines 30-35, the structure should read:

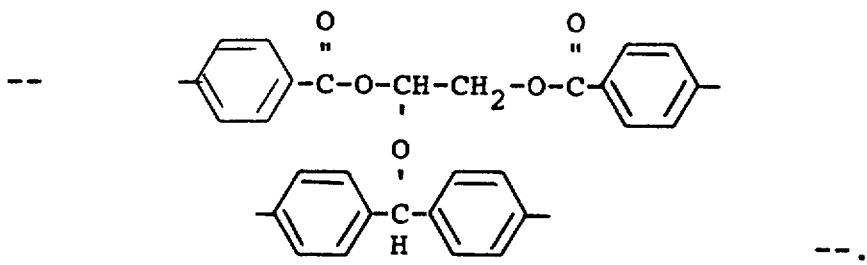

Column 5, line 30, "4475 g." should read -- 44.75 g. --.

Column 5, line 30, "895 g." should read -- 89.5 g. --.

Column 7, line 73, "1,4-cyclohexanadimethanol" should read -- 1,4-cyclohexanedimethanol --.

Column 8, line 2, "hexandimethanol" should read -- hexanedimethanol --.

Column 8, line 52, "empolyed" should read -- employed --.

Column 9, line 41 (Claim 5), "terephthalated" should read -- terephthalate --.

SIGNED AND
SEALED
DEC 8 1970

(SEAL)
Attest:

Edward M. Fletcher, Jr.
Attesting Officer

WILLIAM E. SCHUYLER, JR.
Commissioner of Patents